UNITED STATES PATENT OFFICE.

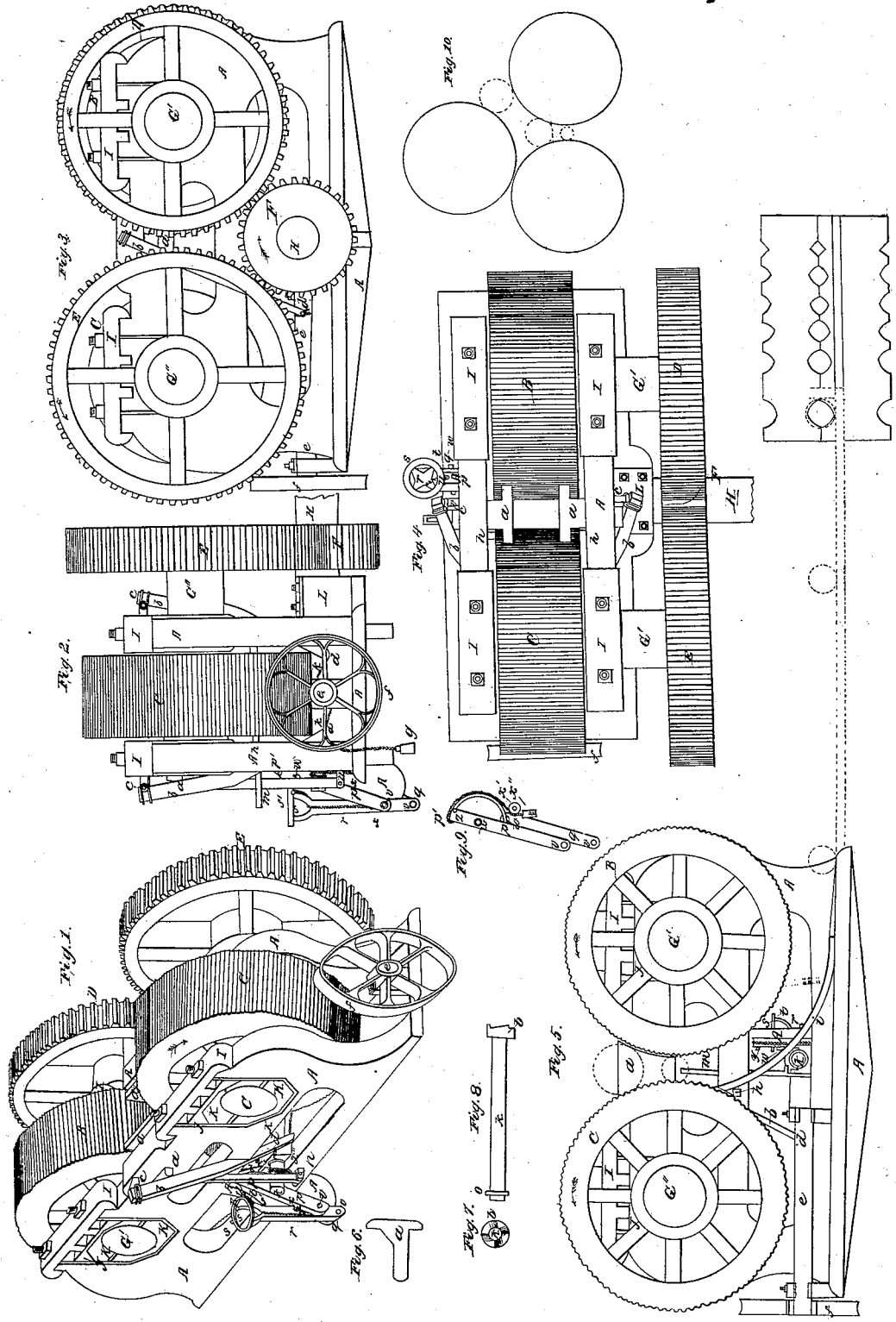
S. S. Jackman,
Compressing Puddler's Balls,
Nº 13,355.
Patented July 31, 1855.

SOLON S. JACKMAN, OF LOCK HAVEN, PENNSYLVANIA.

MACHINE FOR COMPRESSING PUDDLERS' BALLS AND OTHER MASSES OF IRON.

Specification of Letters Patent No. 13,355, dated July 31, 1855.

*To all whom it may concern:*

Be it known that I, SOLON S. JACKMAN, of the borough of Lock Haven, in the county of Clinton and State of Pennsylvania, have invented a new and useful improvement in machines for compressing puddlers' balls or other masses of heated metal or other cohesive substances of proper consistency and forming the same into blooms or cylindrical solids, also for crushing, grinding, or grating substances which are brittle or not cohesive, fruits, &c., to be known as "Jackman's Compressor;" and I do hereby declare that the following is a full, clear, and exact description of the construction and operation of the same, reference being had to the annexed drawings, making a part of this specification and representing the machine as constructed for compressing, in which—

Figure 1, is a perspective view; Fig. 2, an end view; Fig. 3, a side view; Fig. 4, a transverse elevation; Fig. 5, a longitudinal section; Figs. 6, 7, 8, and 9 represent portions detached, the same parts in each figure being designated by the same letters.

A, is a strong bed or frame.

B and C are the compressors having the periphery grooved or fluted, being circular and equal in size.

D and E are cog wheels hung on the same axles, G' G'' on which B and C are hung. The diameter E is greater than that of D. This relation may be reversed, making D and E equal, and B greater than C, or otherwise modified but not so as to prevent the inequality of motion in the peripheries of B and C. D and E both run into the cog wheel or pinion F, which is secured upon the shaft H through which the power is transmitted to the machine, one bearing being at L, the other may be in the machinery from which the power is derived, or it may be near to F, and the shaft H be provided with a clutch joint for breaking connection with that machinery.

I, I are caps secured by bolts or otherwise upon the followers J, J, for the purpose of securing the boxes R, R and the axles G' G''.

$a$, $a$, are movable checks or "upsetters," (a longitudinal section of which is shown Fig. 6), which are inserted in the frame A, apertures being made for that purpose so that the outward end of $a$ comes in contact with the lever $b$, which moves upon a hinge joint $c$, the other end being connected at $d$, by a chain to a shaft $e$ upon which is the pulley $f$, from which is suspended the weight $g$, (as shown Fig. 2).

$h$ is a bar or rest, extending transversely across the machine upon which rests one end of the discharging plate $i$, which is curved as shown at Fig. 5.

$k$ is a small shaft extending across the machine transversely, in a line with the shaft H, with which it is connected by a clutch as shown at $l$ Figs. 7 and 8.

$m$ is a hand lever provided with a projection which takes hold of the collar $o$, upon shaft $k$, $m$ being secured at $n$ by a working joint. The operator is enabled to cause the shaft $k$ to slide in the boxes by moving the upper end of $m$.

$p$, is a lever, the fulcrum of which is made the center of a segment of a pulley for the equal application of power.

$q$ is a vibrating brace taking the same motions and directions as the long arm of $p$, to which it must be exactly equal.

$r$ is an upright supporter, provided with three or more branches or arms at the upper end, upon which rests the circle plate $s$, which is secured to the said arms by a hinge joint $s'$, and provided with a tongue or projection to which is attached a chain. The other end of the chain is made fast in lever $p$, at $x$.

$p$, and $q$ are connected with the supporter $r$ at $v$, and with a projection from frame A, at $w$, by joints which admit of their being moved freely.

$v$ $v$ and $w$ $w$, are respectively perpendicular to each other, and the distance $v$ $v$, being exactly equal to $w$ $w$, $p$ and $q$ must at all times be parallel to each other, and $r$ parallel to, when not in, the line $w$ $w$. A chain is attached to $p$, at $p'$ which passes around the segment of the pulley, over the pulley $x'$, under $x''$ and going upward, winds around the shaft $k$. The relations of $p$, $q$, $x'$ and $x''$ are shown in Fig. 9.

The operation of my machine is as follows: The ball or mass to be acted upon is thrown into the space between B and C, and $a$ and $a$. Now it is plain, that as D and E running into the same driving wheel F, and being unequal in diameter, are hung on the same axles with B and C that the speed of B must be greater than that of C; so that the mass is not only made to revolve on its own axis by the contrary motions of B and C as indicated by the arrows, but by their unequal motions as before explained, it is gradually carried down till, passing the line of the centers of B and C it becomes disengaged by reason of the space becoming greater, and falls upon the curved plate $i$ and is by its own gravitation rolled to a considerable distance from the machine, which may be so situated (as indicated in the diagram attached to Fig. 5) as to deliver its blooms on the foreplate and before the first groove of the rolls, thereby saving the expense of dragging the blooms from the squeezer and lifting them upon the fore plate as has heretofore been done.

In order to prevent the blooms while being compressed from being too much elongated, and irregular and imperfect at the ends, I have invented the following method of resisting that tendency, or as it is usually denominated "upsetting" the bloom. The cheeks $a, a,$ are at sufficient distance apart to admit the ball in all cases and as the bloom by being reduced in diameter, increases in length, the upsetters are pressed outward against the levers $b$, which give back by unwinding the chains from around the shaft $e$, and thereby raising the weight $g$ (Fig. 2). The frame A, is adapted to admit $a, a,$ to pass outward, till the perpendicular position comes in contact with A, which must leave sufficient space between $a, a,$ for the maximum length of blooms required. The corners of faces of $a$ $a$, are rounded sufficiently to prevent the end of the bloom from being sheared, or torn off in its revolutions on its own axis.

It is well known to those skilled in the manufacture of iron, that the amount of pressure in upsetting which the bloom will sustain depends upon the quality of the article undergoing the operation, and since as has been shown, the force applied to $a, a,$ depends upon the amount of weight suspended from pulley $f$, it is plain that the pressure can be increased or diminished at pleasure.

My machine can in most instances be so situated that the balls can be placed in it without difficulty; but as this cannot always be the case, I have invented and attached to my machine, an elevator, which has already been designated in detail, and by which the ball may be received at any required distance from the ground, and deposited in the machine for being compressed. The object to be elevated, is placed upon the circle plate $s$—for which may be substituted any desired form of vessel—the operator then pushes the hand lever $m$, to the position as represented in the drawings annexed, which connects the shafts $k$ and H by means of which $k$, is made to revolve, thereby winding up the chain attached to $p$, at $p'$ as shown Fig. 9, till $p'$ is brought to a position near to $x'$, and $p, q$ and $r$ into the line $w$ $w$, and at the same time the projection $z$ on $p$, comes in contact with the collar $o$, on the shaft $k$ and disengages the clutch $l$, and also at the same time, the burden is thrown from $s$ into the compressor, by reason of the shortness of the chain connecting the plate at $w$, with $p$, at $x$, not permitting $s$ to remain in a horizontal position, when $r$ is brought into the line $w$ $w$. The elevator being thus freed from its burden, and its connection with H, falls back to its first position. A hopper or trough may be placed over $a$ $a$, to conduct the balls with certainty, and also to protect $a$ $a$, from hindrance by any object falling between them and A.

The skilful machinist will readily discover that my compressor will admit of several modifications in its construction and operations without materially changing those features and principles in which it is different and distinct from other machines of similar kind and for similar purposes. Thus, three or more compressors may be used instead of two, as indicated in the diagram 10; the bloom or cylinder passing through successive operations; also the position of the elevator and the mode of applying power to the same admit of variation. Again, the machine either with or without the elevator, and upsetting apparatus, may, by varying the form of surface or periphery, and relative speed of B and C, as has been fully explained, be used for crushing, grinding, or grating substances not cohesive in their nature, etc., with various other modifications which it is not deemed necessary to describe.

Having described my improvement what I claim as my invention and desire to secure by Letters Patent is, The compressing puddlers' balls or similar substances by means of circular compressors B and C so arranged that their peripheries shall have different degrees of speed and their surfaces in contact with the mass to be operated on, shall cause its rotation upon its own axis and by compression between them reduce the metal into a bloom in the manner substantially as described.

SOLON S. JACKMAN.

In presence of—
  CHAS. LEMON,
  ALBERT EBELING.